United States Patent
Martin

(10) Patent No.: US 7,813,865 B2
(45) Date of Patent: Oct. 12, 2010

(54) TORQUE-BASED HYBRID ELECTRIC VEHICLE POWERTRAIN CONTROL SYSTEM AND METHOD

(75) Inventor: Douglas R. Martin, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 90 days.

(21) Appl. No.: 12/270,070

(22) Filed: Nov. 13, 2008

(65) Prior Publication Data

US 2010/0121556 A1    May 13, 2010

(51) Int. Cl.
*B60K 1/00* (2006.01)
*G06F 19/00* (2006.01)
(52) U.S. Cl. ........................ 701/103; 180/65.1; 477/3; 701/22
(58) Field of Classification Search ................. 701/103, 701/22, 102; 180/65.1, 65.21, 65.28; 477/3
See application file for complete search history.

(56) References Cited

U.S. PATENT DOCUMENTS

| | | | |
|---|---|---|---|
| 6,155,954 A | 12/2000 | Itoyama et al. | |
| 6,616,569 B2 | 9/2003 | Hoang et al. | |
| 6,860,244 B2 | 3/2005 | Glugla et al. | |
| 6,873,896 B2 | 3/2005 | Maekawa et al. | |
| 6,994,360 B2 | 2/2006 | Kuang et al. | |
| 7,021,409 B2 * | 4/2006 | Tamor | 180/65.25 |
| 7,124,014 B1 | 10/2006 | Ishida et al. | |
| 7,275,518 B1 | 10/2007 | Gartner et al. | |
| 7,407,026 B2 * | 8/2008 | Tamor | 701/22 |

FOREIGN PATENT DOCUMENTS

EP    1 323 564 A2    7/2003

* cited by examiner

*Primary Examiner*—Hieu T Vo
(74) *Attorney, Agent, or Firm*—David B. Kelley; Brooks Kushman P.C.

(57) ABSTRACT

The invention comprises a control method for a hybrid electric vehicle powertrain having a throttle-controlled engine and an electric motor, a battery and a generator. Compensation is made for differences between driver commanded torque and actual engine torque due to engine throttle contamination using a closed-loop control strategy that creates a throttle setting correction.

12 Claims, 3 Drawing Sheets

|  | TQ error (Nm) | | | |
| --- | --- | --- | --- | --- |
|  | -5 | 0 | 10 | 20 |
| MAP/BP = 0.528 (example graph) | -1.0 | 0 | 2.0 | 3.5 |
| MAP/BP = 0.6 | -1.0 | 0 | 2.0 | 3.5 |
| MAP/BP = 0.7 | 0 | 0 | 1 | 2 |
| MAP/BP = 1 | 0 | 0 | 0 | 0 |

TORQUE-BASED HYBRID ELECTRIC VEHICLE POWERTRAIN CONTROL SYSTEM AND METHOD

BACKGROUND OF THE INVENTION

1. Technical Field

The invention relates to control of engine torque in a hybrid electric vehicle powertrain with an engine and an electric machine for developing motive power.

2. Background Art

A hybrid electric vehicle powertrain may include an internal combustion engine and an electric machine that function as complementary power sources for developing vehicle traction power. In one embodiment, a first power source is a combination of an engine with a gear system for distributing power through separate power flow paths. The engine may be a throttle-controlled internal combustion engine. The second power source is an electric drive system that comprises an electric motor, a generator and a battery. The battery acts as an energy storage medium for the generator and the motor. The generator provides electrical power to the motor, which delivers motive power to the traction wheels through the gear system. When the powertrain is operating using the first power source, the engine power is divided between the two paths by controlling generator speed.

A hybrid electric vehicle powertrain of this type is disclosed, for example in U.S. Pat. No. 7,275,518, which is assigned to the assignee of the present invention. The powertrain of the '518 patent acts in a manner that is similar to characteristics of a continuously variable transmission wherein vehicle speed changes do not depend upon engine speed. The description of the control system for the powertrain disclosed in U.S. Pat. No. 7,275,518 is incorporated herein by reference.

Since the engine and the generator in a powertrain of this type are connected through the gear system, the generator can act as a generator to provide current to charge the battery, which powers the motor, or it may operate as a motor to provide torque input to the gearing. The generator can be used to control the rotational speed of the engine since the generator is connected to a torque reaction element of the gearing. Both the motor and the generator may act as motors using current from the battery to provide the desired traction wheel torque. Alternatively, both the generator and the motor may act as generators to supply electrical power to the battery through a high voltage bus that electrically couples the motor, the generator and the battery.

In a hybrid electric vehicle of the type presently disclosed, the engine operates in a torque control mode rather than an engine speed control mode. Excess torque produced by the engine may develop charging current for the battery, which is controlled to manage battery performance. Further, a desired engine torque and a current engine torque are determined, and the difference can be adjusted based on a stored torque value. This implies that the engine torque made available to the traction wheels includes a stored torque offset, which can be adjusted within a certain engine speed range, based on a steady-state difference between the desired engine torque and the current engine torque to reduce the steady-state difference to zero in a closed loop fashion. If the engine throttle becomes contaminated with sludge, which may comprise environmental debris that affects the air flow around the periphery of a throttle blade, a significant engine torque error will exist between the desired engine torque and the actual engine torque. This adversely affects the calibration of the engine and the ability of the two power sources to function seamlessly to maintain a consistent and smooth torque delivery to the traction wheels from each power source as driver demand for traction wheel power changes.

If sludge accumulates in the throttle body of the engine in the disclosed embodiment of the invention, the actual torque may be less than the desired torque. This may cause the engine to stall in extreme cases because there then would be insufficient air for stable combustion. If there is compensation made for a decrease in the intake air for the throttle and a compensation for sludge is inaccurate, causing more air flow than would be desired for a given power demand, then the torque at the wheels will be greater than desired. This can result in poor drivability since the vehicle system controller would respond to the increased torque at the wheels by cutting fuel delivery to the engine in order to keep wheel torque within calibrated limits and to avoid overcharging the high voltage battery.

SUMMARY OF THE INVENTION

The system and strategy of the invention will adjust the throttle setting in a closed-loop fashion to compensate for adverse effects of a sludge build-up in the engine throttle body. This will achieve a nominal air flow that would correspond to a driver engine power demand. A vehicle system controller receives a desired engine torque signal from a driver controlled accelerator pedal sensor, and then computes a desired air mass using that desired engine torque signal while taking into consideration the engine speed, the air density and other engine control variables. Using a computed desired air mass, a desired engine throttle setting is determined. The desired engine throttle setting will result in a desired engine torque based upon calibrated engine characteristics.

The generator is drivably connected to the engine output through gearing. Since the generator controls engine speed, as previously described, the generator current, which is an indicator of engine torque, is used as an engine torque feedback signal to determine a torque error term. The error term may be maintained within predetermined minimum and maximum values. It then is converted to a throttle angle correction. The throttle angle correction is combined with the desired throttle setting determined by the vehicle operator to achieve a final desired throttle setting. That setting is stored during a current control loop of the vehicle system controller in keep-alive memory (KAM) registers in the vehicle system controller and then used in a subsequent control loop of the controller. In this way a throttle angle correction is continuously updated as the torque error changes toward zero.

PARTICULAR DESCRIPTION OF THE INVENTION

Figure 1:
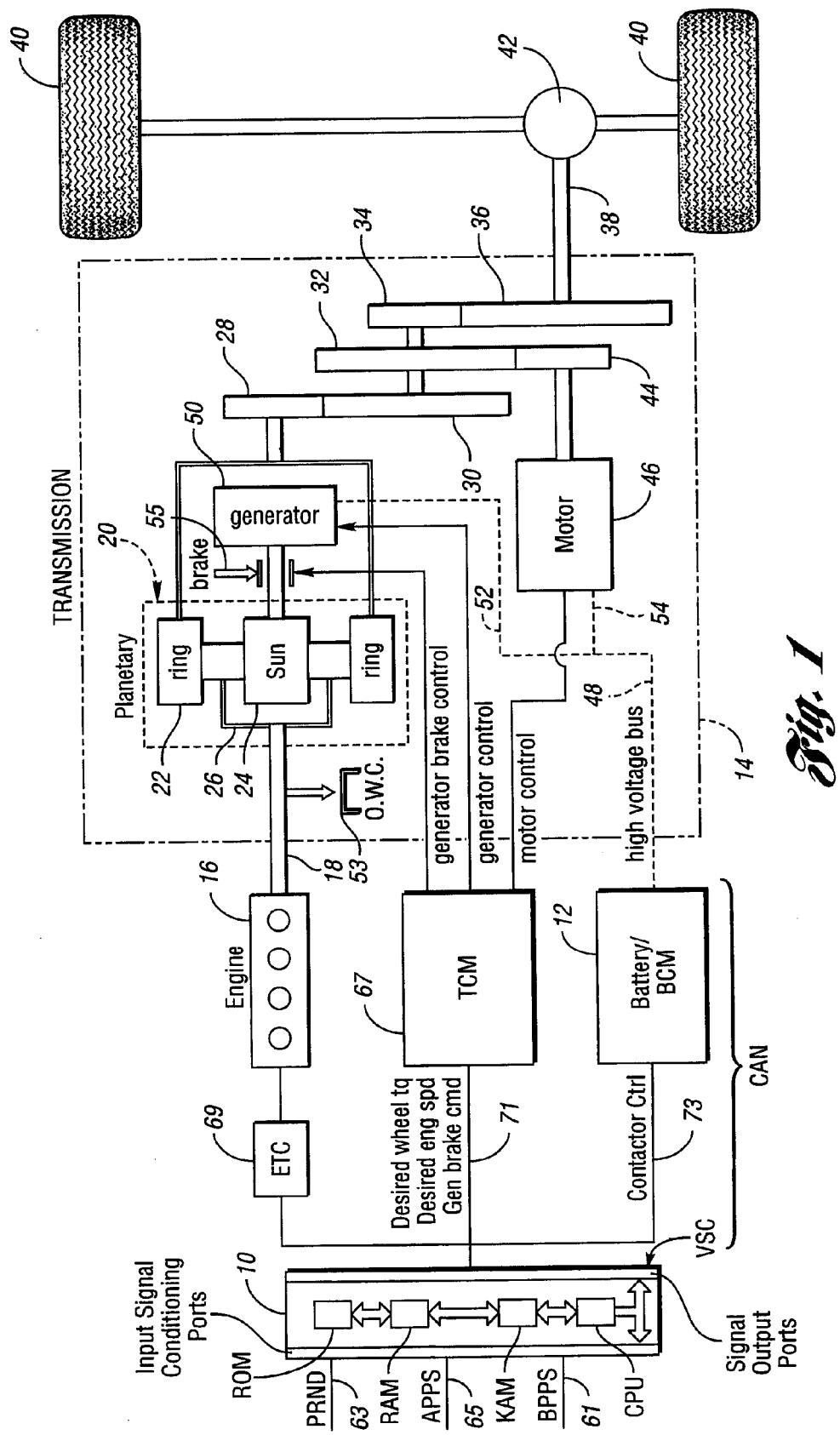
FIG. 1 is a schematic representation of one embodiment of a hybrid electric vehicle powertrain capable of using the control system and strategy of the present invention.

The hybrid electric vehicle powertrain of one embodiment of the invention may have a configuration, as shown in FIG. 1. That configuration has a vehicle system controller 10, a battery and battery control module 12 and a transmission 14, together with a motor-generator subsystem. The controller 10 comprises a part of control area network (CAN). An engine 16, controlled by controller 10, distributes torque through torque input shaft 18 to transmission 14.

The transmission 14 includes a planetary gear unit 20, which comprises a ring gear 22, a sun gear 24, and a planetary carrier assembly 26. The ring gear 22 distributes torque to step ratio gears comprising meshing gear elements 28, 30, 32, 34 and 36. A torque output shaft 38 for the gears is drivably connected to vehicle traction wheels 40 through a differential-and-axle mechanism 42.

Gears 30, 32 and 34 are mounted on a countershaft, the gear 32 engaging a motor-driven gear 44. Electric motor 46 drives gear 44, which acts as a torque input for the countershaft gearing.

The battery 12 delivers electric power to the motor through power flow path 48. Generator 50 is connected electrically to the battery and to the motor in known fashion, as shown at 52. The electrical power flow paths define a high voltage bus.

When the powertrain battery 12 is acting as a sole power source with the engine off, the torque input shaft 18 and the carrier assembly 26 are braked by an overrunning coupling 53. A mechanical brake 55 anchors the rotor of generator 50 and the sun gear 24 when the engine is on and the powertrain is in a parallel drive mode, the sun gear 24 acting as a reaction element.

In FIG. 1, the vehicle system controller 10 receives a signal 63 from a transmission range selector, which is distributed to transmission control module 67. A desired engine speed, a desired wheel torque and a generator brake command, as shown at 71, are other inputs to transmission control module 67.

A battery contactor or switch 73 is closed after vehicle "key-on" startup. The controller 10 issues a desired engine torque request to an electronic engine throttle control 69 for engine 16, which is dependent on accelerator pedal position sensor output 65.

A brake pedal position sensor distributes a wheel brake signal to controller, as shown at 61. The transmission control module issues a generator brake control signal to generator brake 55. It also distributes a generator control signal to generator 50.

As mentioned previously, there are two power sources for the driveline. The first power source is a combination of the engine and generator subsystems, which are connected together using the planetary gear unit 20. The other power source involves only the electric drive system including the motor, the generator and the battery, the battery acting as an energy storage medium for the generator and the motor.

Figure 2:
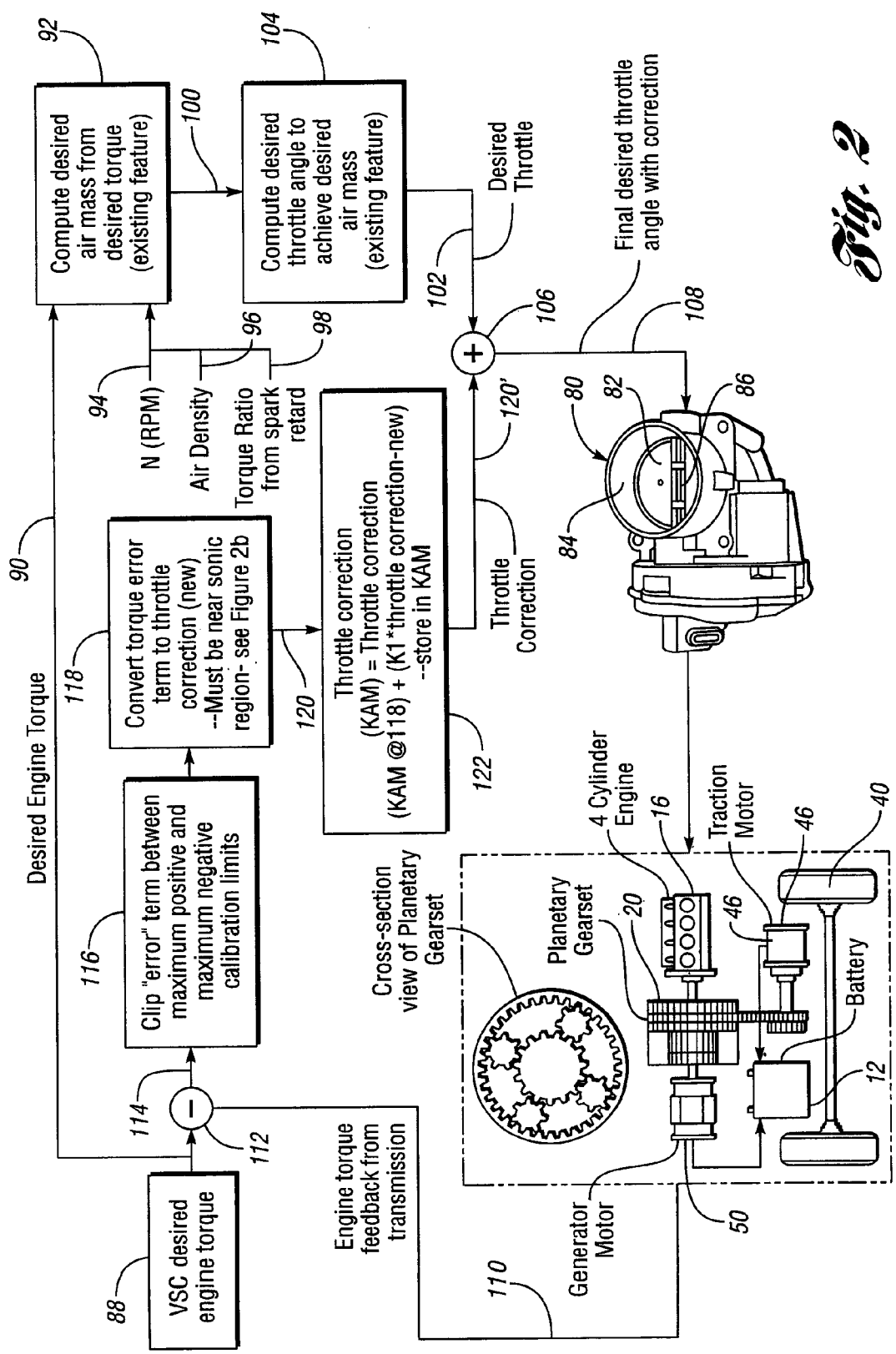
FIG. 2 is a schematic block diagram of a control strategy of the invention.

FIG. 2 is a schematic block diagram showing the overall control strategy of the invention. An engine throttle body for the engine 10 of conventional design is shown at 80 in FIG. 2. It includes an adjustable valve plate 82 situated in air intake opening 84, which communicates with an air intake manifold for the engine in known fashion. Plate 82 is mounted on a pivot shaft 86, which can be oscillated to open and close throttle valve plate 82 depending upon the throttle angle determined by an accelerator pedal position selected by the driver.

The vehicle system controller 10 will receive the accelerator pedal position signal 65 in FIG. 1 and will command the electronic throttle control 69 to adjust the engine throttle to effect a desired engine torque, as shown at 88 in FIG. 2. That desired engine torque, which may include engine friction and pumping torque losses determined by a calibrated look-up table, is distributed through a feed-forward signal path 90 to function block 92. To compensate for spark retard, if the engine is a spark-ignition engine, this value for desired engine torque is divided by torque ratio (e.g., 0.70 to 0.95) to obtain requested indicated torque.

A look-up table at function block 92 maps the relationship between engine speed at 94, engine load and the indicated torque. Another table at function block 92 is used to look-up the load required to deliver the requested indicated torque at any given engine speed (rpm), which is one of the input variables at block 92. The desired load is then converted to a desired cylinder air charge using the relationship:

$$\text{Load} = \frac{\text{Cylinder air charge}_s}{\text{Standard air charge}_s}$$

Where standard air charge is determined by the cylinder geometry at a standard air pressure.

The desired cylinder air charge then is converted to a desired air mass at 100 using engine speed variable at 94.

The desired air mass is distributed to function block 104, which includes an electronic throttle control conversion table. That table has pressure ratio and desired air mass as inputs, and desired throttle position as the output at 102. The desired throttle position is added to a throttle correction 120', as shown at 106, which was stored in KAM during a preceding control loop of the controller 10. This will be explained subsequently.

The electronic throttle control 69 will respond to the final desired throttle angle with the correction signal at 108, thereby causing the engine 16 to develop an engine torque corresponding to the final throttle angle signal. Engine torque, which is delivered to carrier 26 of the planetary gear unit 20, will result in a sun gear torque determined by the gear ratio of the planetary gear unit 20. As previously indicated, the generator controls engine speed. The amount of generator current that is necessary to hold that speed is an indicator of the engine feedback torque at 110.

That feedback torque term then is compared at 112 to the original desired engine torque. Any difference in these values is used as an error signal 114. If necessary, the value of that signal may be clipped, or filtered, at function block 116 so that the error does not exceed maximum and minimum calibration limits. A conversion then takes place at function block 118, whereby the error term is used to develop a throttle angle correction 120. This is done using the plot shown at FIG. 2b, which is stored in ROM. For every torque compensation, or error, determined in a given processor control loop and for every manifold pressure and ambient pressure ratio shown in FIG. 2a, there will be a throttle angle correction.

Figures 2A, 2B:
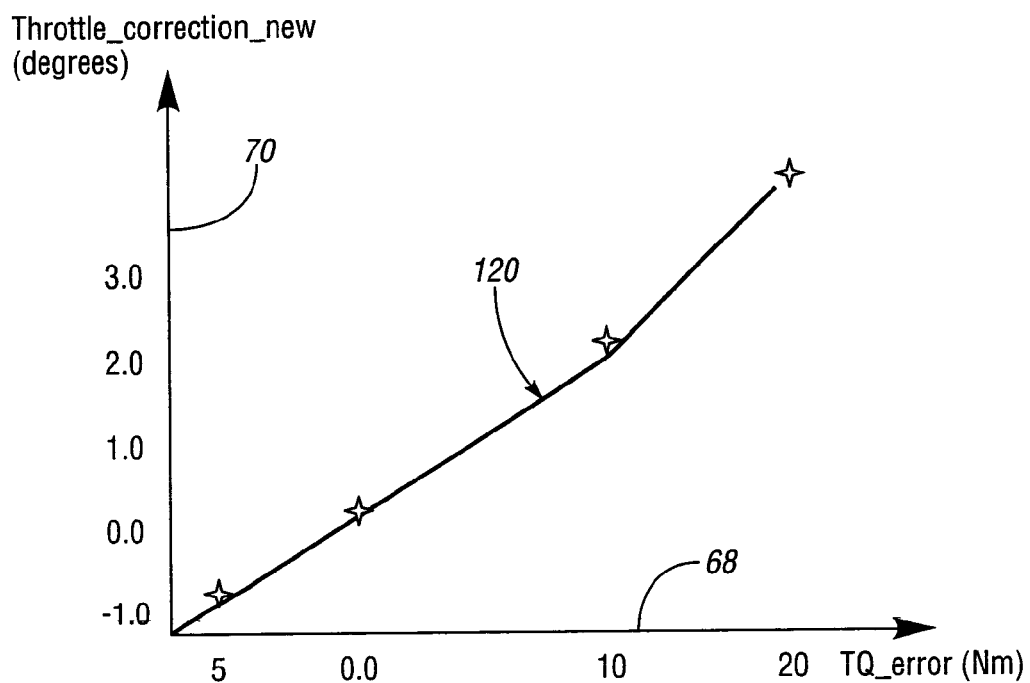
FIG. 2a is a table, which is stored in read-only memory registers (ROM) of the vehicle system controller, wherein the relationship between absolute manifold pressure, which is measured or inferred, and a torque compensation or error are indicated for each throttle angle correction.
FIG. 2b is a plot in two-dimensional form of information seen in FIG. 2a, showing a relationship between torque error and throttle compensation.

FIG. 2b is a two-dimensional plot of the information shown in FIG. 2a. Torque compensation, or error, is plotted on the abscissa 68 of FIG. 2b, and throttle angle correction angle is plotted on the ordinant 70. A typical throttle angle correction plot is shown at 120. The throttle angle correction plot could take a different shape depending upon the engine characteristics.

The throttle angle correction is integrated and stored in the KAM portion of memory, where it is kept alive for use in the next processor control loop. The value of the throttle angle correction thus will be continuously updated, whereby a so-called rolling average value for the correction will be used. This operation is carried out at function block 122 in FIG. 2. The final throttle correction signal at 120' is added to the desired throttle signal at 102, as explained previously, so that the effective throttle angle signal is the value at 108.

Although an embodiment of the invention has been disclosed, it will be apparent to persons skilled in the art that modifications may be made without departing from the scope of the invention. All such modifications and equivalents thereof are defined by the following claims.

What is claimed:

1. A powertrain control system for a hybrid electric vehicle having a throttle-controlled engine, an electric motor, and a generator, comprising:
    torque flow paths from the engine and the motor to vehicle traction wheels; and
    a controller for coordinating torque delivery through the torque flow paths;
    the controller being configured to:
    develop a desired engine throttle setting corresponding to a desired engine torque;
    compute a corrected engine throttle setting to compensate for engine throttle function abnormalities based on the desired engine throttle setting;
    compute a torque error signal equal to a difference between desired engine torque and an engine torque feedback corresponding to the corrected engine throttle setting and to generator current as the generator controls engine speed; and
    convert the torque error to an engine throttle setting correction during a given controller loop for use in a succeeding controller loop to develop the engine torque feedback.

2. The control system set forth in claim 1 wherein the desired engine throttle setting is developed using a desired air mass, the desired air mass being a variable in a look-up table stored in memory registers of the controller.

3. A method for controlling motive power distribution in a hybrid electric vehicle powertrain having a throttle-controlled engine and an electronic engine controller, the method comprising:
    developing a desired engine torque during a controller processor control loop based upon engine input operating variables including engine speed and an engine throttle setting selected by a driver;
    determining in a preceding controller processor control loop an error between actual engine torque output and desired engine torque;
    computing an engine throttle setting correction based upon the torque error in the preceding control loop;
    combining a desired engine throttle setting and the throttle setting correction to obtain a final desired throttle setting in a current engine controller processor control loop; and
    using the final desired engine throttle setting to develop a feedback torque signal for use in a subsequent controller processor control loop whereby compensation is made for an engine throttle malfunction.

4. The method set forth in claim 3 whereby the throttle setting correction is made to compensate for sludge accumulated on the engine throttle.

5. The method set forth in claim 3 wherein the engine throttle comprises an adjustable throttle plate, the step of computing a throttle setting correction is made to compensate for contaminants that accumulate on the engine throttle.

6. The method set forth in claim 5 wherein the contaminants comprise sludge on the engine throttle that affects air flow past the engine throttle to an air intake manifold of the engine.

7. The method set forth in claim 3 wherein the step of developing a desired setting for an engine throttle corresponding to the desired engine torque includes the step of computing a desired air mass flow rate based on the desired engine torque, and computing the desired engine throttle setting to achieve a desired air mass flow rate.

8. A method for controlling motive power distribution in a hybrid electric vehicle powertrain including at least an engine, a generator and a vehicle system controller for coordinating the motive power distribution to vehicle traction wheels;
    the method comprising the steps of:
    developing a desired engine throttle setting corresponding to a desired engine torque;
    computing a corrected engine throttle setting based upon the desired engine throttle setting to compensate for engine throttle function abnormalities;
    computing a torque error signal equal to a difference between desired engine torque and an engine torque feedback corresponding to the corrected engine throttle setting and to generator current as the generator controls engine speed; and
    converting the torque error signal to an updated engine throttle setting correction whereby a compensation is made for engine throttle function abnormalities.

9. The method set forth in claim 8 whereby the step of converting the torque error signal to an updated throttle setting correction is made to compensate for sludge accumulated on the engine throttle.

10. The method set forth in claim 8 wherein the engine throttle comprises an adjustable throttle plate, the step of converting the torque error signal to an updated throttle setting correction is made to compensate for contaminants that accumulate on a margin of the throttle plate.

11. The method set forth in claim 8 wherein the step of developing a desired setting for an engine throttle corresponding to the desired engine torque includes the step of computing a desired air mass flow rate based on the desired engine torque, and computing the desired engine throttle setting to achieve the desired air mass flow rate.

12. The method set forth in claim 8 wherein the torque error signal is computed in each control loop of the vehicle system controller;
    the corrected engine throttle setting being computed in a control loop following the control loop in which the engine torque error signal is computed.

\* \* \* \* \*